United States Patent
Hiari et al.

(10) Patent No.: US 9,954,586 B1
(45) Date of Patent: Apr. 24, 2018

(54) SINGLE RF CHAIN TRANSMITTER IMPLEMENTING SPACE MODULATION

(71) Applicants: Omar Hiari, Amman (JO); Raed Mesleh, Amman (JO)

(72) Inventors: Omar Hiari, Amman (JO); Raed Mesleh, Amman (JO)

(73) Assignee: GERMAN JORDANIAN UNIVERSITY, Amman (JO)

( * ) Notice: Subject to any disclaimer, the term of this patent is extended or adjusted under 35 U.S.C. 154(b) by 0 days.

(21) Appl. No.: 15/632,151

(22) Filed: Jun. 23, 2017

(51) Int. Cl.
*H04B 7/0413* (2017.01)
*H04B 7/06* (2006.01)

(52) U.S. Cl.
CPC ......... *H04B 7/0413* (2013.01); *H04B 7/0602* (2013.01)

(58) Field of Classification Search
CPC ............. H04L 27/2627; H04L 25/0204; H04L 27/2649; H04B 7/0413; H04B 7/0602
See application file for complete search history.

(56) References Cited

U.S. PATENT DOCUMENTS

| 9,614,708 | B1 | 4/2017 | Mohamed et al. | |
| 9,722,730 | B1* | 8/2017 | Huang | H04L 1/0054 |
| 2011/0069633 | A1* | 3/2011 | Schmidt | H01Q 1/246 |
| | | | | 370/254 |
| 2012/0134433 | A1 | 5/2012 | Haas et al. | |
| 2015/0146803 | A1* | 5/2015 | Kim | H04L 27/2627 |
| | | | | 375/260 |
| 2015/0146815 | A1 | 5/2015 | Berretta et al. | |
| 2016/0126627 | A1 | 5/2016 | Lee et al. | |
| 2016/0352362 | A1* | 12/2016 | Fonseka | H03M 13/2906 |

OTHER PUBLICATIONS

Mesleh et al., "Spatial Modulation", IEEE Transactions on Vehicular Technology, vol. 57, No. 4 (2008), pp. 2228-2241.
Jeganathan et al., "Keying Modulation for MIMO Channels", IEEE Transactions on Wireless Communications, vol. 8, No. 7 (2009), pp. 3692-3703.
Barousis et al., "A Complete MIMO System Built on a Single RF Communication Ends", PIERS Online, vol. 6, No. 6 (2010), pp. 559-563.

(Continued)

*Primary Examiner* — Janice Tieu
(74) *Attorney, Agent, or Firm* — Richard C. Ltman

(57) ABSTRACT

The single RF chain transmitter implementing space modulation provides wireless multiple-input multiple-output (MIMO) communications that are implemented through a single radio frequency (RF) chain using multiple transmit antennas. A symbol stream is used to provide a single RF signal output modulated by a quadrature or complex symbol stream. An RF switching circuit is used to direct the single RF signal output sequentially to antenna subsets including one or more antennas of a plurality of antennas. An index of the antenna subsets is provided to allow switching by the RF switching circuit according to the index of antenna subsets provides spatial modulation (SM) of the RF signal output as transmitted to through the antennas. The transmitted RF signal output is rendered as a single RF chain through the plurality of antennas as transmitted through the antenna subsets.

6 Claims, 11 Drawing Sheets

(56) References Cited

OTHER PUBLICATIONS

Som et al., "Spatial Modulation and Space Shift Keying in Single Carrier Communication", 2012 IEEE 23rd International Symposium on Personal Indoor and Mobile Radio Communications, pp. 1962-1967.

Wu et al., "Channel Estimation for Spatial Modulation", 2013 IEEE 24th International Symposium on Personal, Indoor and Mobile Radio Communications: Fundamentals and PHY Track, pp. 306-310.

Mesleh et al., "Quadrature Spatial Modulation", IEEE Transactions on Vehicular Technology, vol. 64, No. 6 (2015), pp. 2738-2742.

Datta et al., "Generalized Space and Frequency Modulation", IEEE Transactions on Vehicular Technology, vol. 65, No. 7 (2016), pp. 4911-4924.

Ertugrul Basar, "Index Modulation Techniques for 5G Wireless Networks", IEEE Communications Magazine, vol. 54, No. 7 (2016), pp. 168-175.

\* cited by examiner

SINGLE RF CHAIN TRANSMITTER IMPLEMENTING SPACE MODULATION

BACKGROUND OF THE INVENTION

1. Field of the Invention

The present invention relates to wireless communications, such as shared channel spread-spectrum communications, and particularly to a single RF chain transmitter implementing space modulation at the physical layer with multiple transmit antennas.

2. Description of the Related Art

The recent emergence of Internet of Things (IoT) applications has increased the demand for reliable, energy efficient, high bandwidth, and low latency connected systems. Being one of the core elements of IoT, wireless technology is under continuous development to accommodate the IoT application demands. Continually emerging wireless standards, such as 5G or WiFi, try to address the ever-increasing demand for higher data rates; however, aside from the data rate criteria of IoT supporting standards, the complexity, power consumption, cost, and reliability of the underlying hardware supporting the standards needs to be improved as well.

Space Modulation Techniques (SMTs) are a family of wireless communication systems employing multiple transmit antennas at the transmitter side. An example of an existing SMT is described by U.S. Patent Application Publication No. 2012/0134433, published May 31, 2012, which is hereby incorporated by reference in its entirety.

Multiple input, multiple output (MIMO) systems implement SMTs, and have emerged recently as systems that can address the promise of 5G. SMTs differ from other conventional wireless MIMO systems in the way they encode data bits at the transmitter. At each time instant, data bits are mapped to an ordinary complex symbol drawn from an arbitrary constellation diagram, such as phase shift keying (PSK), quadrature amplitude modulation (QAM), or others, and a spatial constellation symbol. The spatial constellation symbol is represented by an antenna index that signifies a single transmit antenna or a group of transmit antennas. The spatial symbol indicates the transmit antenna that will be activated during a particular time instant to transmit the ordinary complex symbol.

In current MIMO systems, each transmit antenna is driven by a single RF chain. By way of example, if four antennas exist at the transmitter, four RF chains are needed. Existing MIMO techniques that use multiple RF chains (one for each antenna) can implement a single modulation technique.

Thus, a single RF chain transmitter implementing space modulation solving the aforementioned problems is desired.

SUMMARY OF THE INVENTION

The single RF chain transmitter implementing space modulation includes a circuit receiving data bits and forming a plurality of symbols therefrom by mapping the data bits to a quadrature or complex symbol signal stream based on a predetermined symbol constellation. The transmitter also features a decoder circuit receiving the quadrature or complex symbol stream and providing a single RF signal output modulated by the quadrature or complex symbol stream. The transmitter further includes an RF switching circuit directing the single RF signal output sequentially to antenna subsets having one or more antennas of a plurality of antennas, as well as a circuit to provide data providing an index of the antenna subsets. Switching by the RF switching circuit according to the index of antenna subsets provides spatial modulation (SM) of the RF signal output as transmitted through the antennas, rendered as a single RF chain through the plurality of antennas as transmitted through the antenna subsets.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
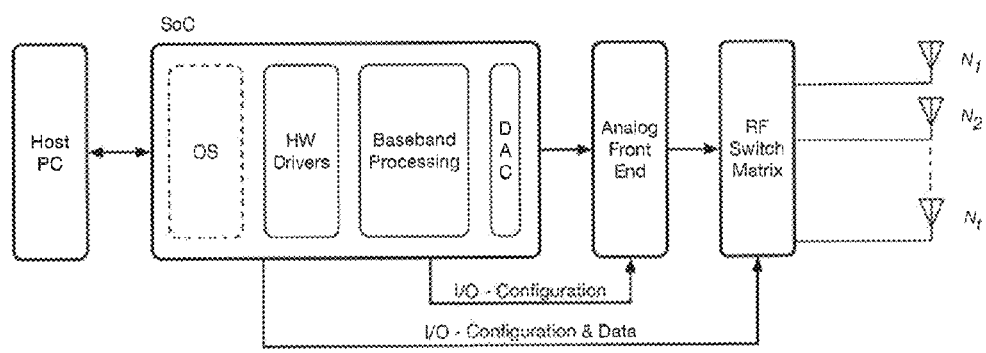
FIG. 1 is a block diagram of an embodiment of a single RF chain transmitter implementing space modulation according to the present invention having a software defined radio (SDR) front end.

The single RF chain transmitter implementing space modulation presents a number of transmitter configurations that use spatial modulation techniques (the terms "space modulation" and "spatial modulation" are used synonymously and interchangeably herein) to provide multiple-input-multiple-output (MIMO) methods that use multiple transmit antennas in an innovative fashion. As used herein, an "RF chain" refers to the transmitter analog front-end hardware. Of the transmitter configurations presented herein, the SSK, QSSK, GSSK, and GQSSK transmitters can be implemented with no RF chain. The SM, GSM, QSM, and GQSM transmitters can be implemented with only a single RF chain, even though multiple transmit antennas are present. The SMX transmitter is an exemplary conventional MIMO transmitter configuration of the prior art that uses an RF chain for each transmit antenna.

Space Modulation Techniques (SMTs) are a family of wireless communication systems employing multiple transmit antennas at the transmitter side. The disclosed techniques differ from conventional wireless multiple-input multiple-output (MIMO) systems in the way they encode data bits at the transmitter. At each time instant, data bits are mapped to an ordinary complex symbol drawn from an arbitrary constellation diagram, such as phase shift keying (PSK), quadrature amplitude modulation (QAM), other spatial constellation symbols, and other arbitrary constellation configurations. The family of SMTs include space shift keying (SSK), generalized space shift keying (GSSK), spatial modulation (SM), generalized spatial modulation (GSM), quadrature space shift keying (QSSK), quadrature spatial modulation (QSM), generalized quadrature space shift keying (GQSSK), and generalized quadrature spatial modulation (GQSM).

Space modulation techniques (SMTs), in which some or all of the data bits modulate a block of a spatial constellation symbol, can be implemented for future 5G wireless systems. SMTs can provide data rate enhancements while maintaining low energy consumption, hardware cost and computational complexity. One of the major assets of SMTs is their capability of operating with a single RF chain at the transmitter, even though multiple antennas might be activated at one time instant. SMTs include different system configurations such as spatial modulation, space shift keying, quadrature spatial modulation, and quadrature space shift keying. While SMTs have been proposed, the present disclosure describes implementation of an SMT with a single RF chain.

SSK based transmitters do not require an RF chain, but only an RF-carrier signal (e.g., $\cos(2\pi f_c t)$, wherein $f_c$ is the carrier frequency) is routed to the antennas. The symbol information is transmitted exclusively via the activated antenna. The length of the word that can be transmitted in the case of SSK is dependent on the number of antennas utilized. The maximum word length possible to transmit in SSK can be expressed as follows:

$$\eta_{ssk} = \log_2 N_t \quad (1)$$

where $\eta_{ssk}$ is the maximum possible word length and $N_t$ is the number of antennas available.

SM-based transmitters leverage both an RF chain and the antennas to transmit data. The word being transmitted is split into two parts, a part that is coded in the antenna index and another that is modulated in the RF chain. The RF chain consists of the blocks needed for baseband processing and the RF analog front end. The maximum word length possible to transmit in SM can be expressed as follows:

$$\eta_{SM} = \log_2 N_t + \log_2 M \quad (2)$$

where $\eta_{SM}$ is the maximum possible word length for the SM scheme, $N_t$ is the number of antennas available, and M is the modulation scheme number of constellation symbols.

FIG. 1 is a block diagram of single RF chain transmitter implementing space modulation that is achievable in SDR (software-designed radio) using commercial of-the-shelf (COTS) components. Moreover, it has been found how the same platform architecture can be dynamically reconfigured to implement any SMT without any additional overhead on the FPGA side and with minimal additional power consumption.

Some of these techniques can operate without any RF chain, whereas a single-RF chain is sufficient for other systems. These schemes can be traded off in terms of energy savings, complexity, performance and cost.

Generalized space modulation techniques (GSMTs), such as generalized space shift keying (GSSK) and generalized spatial modulation (GSM), activate a block of transmit antennas at one time instant to transmit the same data symbol. The aim is to allow the use of arbitrary number of transmit antennas not necessarily power of two. In this disclosure, novel generalized quadrature space shift keying (GQSSK) and generalized quadrature spatial modulation (GQSM) are proposed. It has previously been thought that GSMTs schemes require a number of RF chains equal to the number of active antennas. A general framework for analyzing the average bit error probability of all these systems is shown in the present disclosure to accurately predict the error performance over Rayleigh fading channels. Besides, receiver computational complexity, transmitter power consumption and a rough estimate on the hardware implementation costs for all these schemes are provided and compared. It is shown that the transmitter implementation of all these schemes requires, at most, a single RF chain, and in some cases, no RF chain is needed. In addition, it is shown that the GQSSK scheme outperforms all other systems and demonstrates the best error performance, with low complexity, very low power consumption, and modest implementation costs.

Two families can be identified among the different SMTs. In particular, a space shift keying (SSK) family and a spatial modulation (SM) family can be defined. In the SSK family, such as SSK and quadrature SSK (QSSK), data bits are transmitted through modulating spatial symbols only, and no data symbols are transmitted. However, in SM techniques, such as SM and quadrature SM (QSM), both spatial and signal symbols are used to convey information.

The spatial constellation symbol is represented by an antenna index that signifies a single transmit antenna or a group of transmit antennas. The spatial symbol indicates the transmit antennas that will be activated during a particular time instant to transmit the ordinary complex symbol.

The disclosed technology describes the transmitter design used to implement the different SMTs. The disclosed technology uses a single RF chain and can reconfigure to implement any SMT. One of the main features of SMTs is the ability to operate with a single RF chain transmitter, even though multiple transmit antennas exist. In the disclosed technology, a distinct design is used for each of the above SMTs using a single RF chain. This also provides a reconfigurable design using software-defined radio (SDR) for one system that can be configured to any of the above SMTs. The use of a single RF chain provides an improvement over MIMO and other systems in terms of data rate, complexity, cost, and energy consumption.

The 5G wireless communication standard is targeting much higher data rates as compared to existing wireless technologies to accommodate the ever-increasing demand for faster wireless applications. CISCO®, a data communications equipment manufacturer, anticipated recently a huge increase in global data traffic driven by the exponential growth in the number of wireless devices worldwide. Mobile data traffic is expected to reach 30.6 exabytes per month by 2020. Besides the high data rate requirements of the 5G standard, communication latency, power consumption, hardware complexity and cost should all be significantly reduced.

Among the several proposed technologies for 5G standard, multiple-input multiple-output (MIMO) techniques with small and large scale configurations promise significant data rate gains. Spatial multiplexing (SMX) MIMO systems treat the multiple transmit antennas as independent links that can be utilized to transmit parallel data streams. As such, it allows accommodation of more users at higher data rates with better reliability. Nonetheless, the energy consumption, hardware complexity, and cost significantly increase with deploying more transmit antennas. In conventional MIMO, each transmit antenna must be driven by a complete transmit chain, including modulators, power amplifiers, filters and other components. Hence, typically, higher spectral efficiency is associated with increased power consumption, which, in turn, degrades the energy efficiency thereof. Achieving both higher energy efficiency and spectral efficiency is a dilemma that needs to be solved for 5G systems.

Space modulation techniques (SMTs) are alternative MIMO transmission schemes that code information bits in the spatial location of transmit antennas. In such systems, one or more of the available antennas at the transmitter is activated at one particular time instant, and the index of the active antenna or antennas is utilized to convey information bits. A common advantage that is always listed for all SMTs is their need for a single RF chain at the transmitter. Therefore, MIMO implementation with a single RF chain can potentially reduce the cost, complexity, and energy consumption of the transmitter. In addition, due to the avoidance of inter-channel interference (ICI) among transmitted streams, a low complexity implementation of the maximum likelihood receiver is conceivable. For this, and in addition to other advantages, SMTs have been investigated widely in the past few years. Recently, several attempts were made to measure the performance of these techniques over MIMO testbeds. These MIMO techniques use a SMX MIMO transmitter, where each RF chain is turned on and off completely to operate SMTs. Further, it was always debated among researchers about how many RF chains are needed for SMTs that activate more than one transmit antenna at a time, such as quadrature spatial modulation (QSM).

Transmitter designs for the different SMTs are available, including space shift keying (SSK), spatial modulation (SM), quadrature SSK (QSSK) and QSM. Hardware components involved and their impact on the overall system performance are discussed. In addition, the performance of these schemes is studied and compared to a conventional SMX MIMO system. Different systems require variant hardware components, and different parameters need to be carefully considered in the design process. The performance of these schemes in terms of average bit error probability, energy consumption, hardware complexity and cost are briefly disclosed. It is also revealed that all mentioned SMTs can, indeed, operate with a maximum of a single RF chain transmitter utilizing off-the-shelf hardware components, such as RF switches, combiners, splitters and others. It is also disclosed that the spatial modulation mapping tables for some of these schemes need to be modified to facilitate such designs. As well, some of these techniques are shown not to require any RF chain at the transmitter and can be solely designed through RF switches and other simple components.

SMTs exhibit the following four properties. (1) Transmitter designs can be configured with minimum number of hardware components for SSK, SM, QSSK and QSM systems. (2) SMTs provide good performance in terms of average error probability, energy consumption, cost, and receiver complexity. (3) SMTs can be configured according to a general analytical formula for calculating the average bit error rate (BER). (4) Practical models can be used for calculating the transmitter energy consumption, based on the EARTH model.

One limitation of SMTs is a requirement that the number of transmit antennas must be a power of two integer. To alleviate such strict necessity, generalized SMTs (GSMTs), such as generalized SSK (GSSK) and generalized SM (GSM), are developed. In GSMTs, a group of transmit antennas is activated at each particular time instant to transmit the same carrier signal and the overall transmit power is divided among activated antennas. As such, GSMTs schemes allow the use of arbitrary number of transmit antennas.

A generalized QSSK (GQSSK) scheme activates a block of transmit antennas to transmit the unmodulated cosine part of the RF carrier signal. Additionally, another group of transmit antennas is selected to transmit the un-modulated quadrature part (sine part) of the carrier signal. In GQSM, a similar system as for GQSSK is adopted, except that the transmitted carrier signals are now modulated through complex symbols. The disclosed technology provides a design of the transmitter for the different GSMTs with an optimum number of RF chains. It has been postulated that the required number of RF chains to operate GSMTs transmitter must equal the number of active antennas at each time instant. GSSK and GQSSK transmitters can be implemented with no RF chain and only a single RF chain is needed to implement GSM and GQSM regardless of the number of activated antennas, while utilizing off-the-shelf hardware components, such as RF switches, combiners, splitters and others. In some cases, the spatial modulation mapping tables for some of these schemes need to be modified to enable single RF chain transmission, and in some schemes additional antennas can be expected to be needed to facilitate such designs. The derived analytical boundaries are applicable for most GSMTs and accurate matching between Monte Carlo simulation and analytical results is expected.

The present transmitters function in a wireless multiple-input multiple-output (MIMO) communications system, implementing a single radio frequency (RF) chain using multiple transmit antennas. Data bits are received at a data receiving or data input circuit, and the data bits are used to form a quadrature or complex symbol signal stream based on a symbol constellation. A decoder circuit receives the quadrature or complex symbol stream and provides a single RF signal output modulated by the quadrature or complex symbol stream. An RF switching circuit directs the single RF signal output sequentially to antenna subsets, in which the antenna subsets comprise one or more antennas. An index circuit or index data providing circuit provides an index of the antenna subsets. Switching is performed by the RF switching circuit according to the index of antenna subsets.

The RF switching provides spatial modulation (SM) of the RF signal output as transmitted through the antennas. The RF output is rendered as a single RF chain through the plurality of antennas as transmitted through the antenna subsets. The transmitter designs afford a minimum number of RF chains for the different SMTs, as described in the examples.

In one example, the RF switching circuit activates one or more of the plurality of antennas at any given time during transmission of the single RF chain according to the index of antenna subsets. In another example, a switching speed of the RF switching circuit and a symbol time renders a maximum achievable data rate. Each antenna subset comprises a distinct antenna array within the plurality of antennas, and the plurality of antennas comprises plural distinct antenna arrays. In another example, each antenna subset comprises a single antenna array within the plurality of antennas. In another example, at least one antenna subset comprises a single antenna array within the plurality of antennas and the plurality of antennas comprises plural distinct antenna arrays. In another example, at least one antenna subset comprises a single antenna within the plurality of antennas.

By way of examples, the spatial modulation (SM) of the RF signal provides space shift keying (SSK) implemented with space modulation, as space modulation techniques (SMTs), the SMTs comprising modulation selected from the group consisting of SSK, SM, QSSK, QSM, GSSK, GSM, GQSSK and GQSM.

The transmitters comprise the SDR platform including the processing hardware and software implementing the SMTs, the transmitter analog front-end hardware (RF chain), an RF routing network, and transmit antennas. The RF routing network may include splitters and combiners.

The SDR platform essentially determines which SMT is implemented. In addition, the SDR platform can be reconfigured in the system to implement any of the other SMTs. The analog front-end is standard hardware that is required almost for any wireless application to condition signals. The use of an analog front-end is given by way of example, as a digital front end can also be used for the purpose.

The RF routing network determines how each wireless signal is routed. The RF routing network is configured and controlled by the SDR platform. The antennas are the component used to propagate the signals in the wireless environment.

A conventional transmitter design used in typical MIMO systems, in which each transmit antenna is driven by one RF chain, can be used for SMTs. However, the disclosed techniques simplify the transmitter circuit, reduce the cost, and enhance energy efficiency by using a single RF chain. Therefore, the disclosed technology relates to the optimum design of single-RF chain SMTs transmitter circuits.

EXAMPLE 1

Space Shift Keying (SSK) Transmitter

Figure 2:
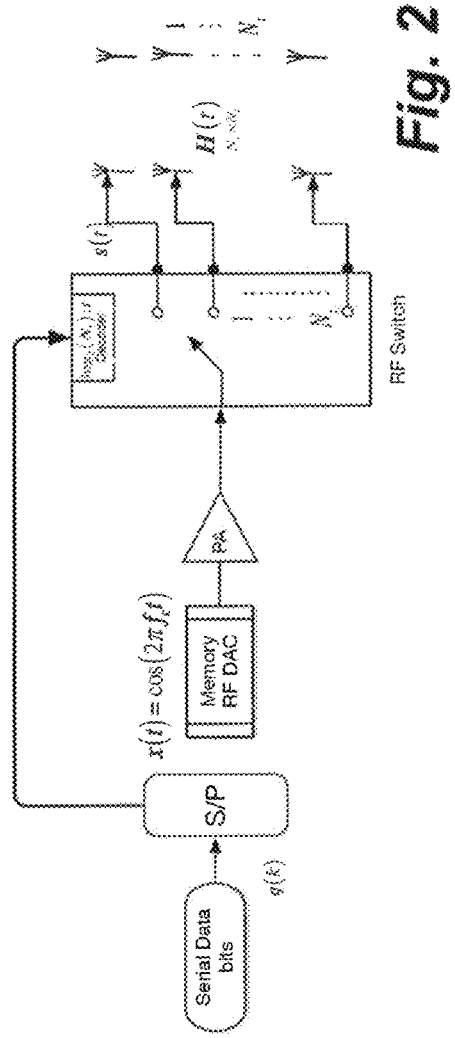
FIG. 2 is a schematic diagram showing the configuration of a design for an SSK transmitter with an arbitrary number of transmit antennas.

FIG. 2 is a schematic diagram showing the configuration of a design for an SSK transmitter with an arbitrary number of transmit antennas. This presents a transmitter design for an SSK MIMO system. SSK is the simplest form of the family of SMTs. In the SSK system, data are transmitted through spatial constellation symbols only. At each time instant, $\eta=\log_2(N_t)$ data bits modulate a transmit antenna index, $l \in 1, 2, \ldots, N_t$, among the set of existing $N_t$ transmit antennas. Only that particular antenna is active at this particular time instant and transmits a fixed, unmodulated RF signal. In FIG. 2, the cosine part of the RF carrier, $x(t)=\cos(2\pi f_c t)$, with $f_c$ denoting the carrier frequency, is considered for illustration purposes. However, the sine part, or any other fixed signal, can be considered. As such, the SSK scheme requires no RF chains at the transmitter, and the transmitter can be entirely designed through RF switches. Since no information is modulated on the carrier signal, it can be generated once and stored for further use in all other transmissions.

Therefore, the SSK transmitter is basically an RF switch with a single input and $N_t$ RF outputs. The incoming $\eta=\log_2(N_t)$ bits control the RF switch and determine the active port at each particular time instant. Typical transmission components, such as an IQ modulator, a power amplifier, pulse shaping filters, and others are not needed in an SSK system. This results in a very simple, energy efficient, and cost efficient technique. Nonetheless, special attention needs to be paid to the selected RF switch parameters, including rise-time, fall-time, insertion loss, isolation, and switching time. The RF switch is widely considered in the past, but it is not used in the same concept as disclosed here. Conventionally, an RF switch is used to select a single RF signal from several RF inputs and has one output.

The RF switch is a passive RF component and is reciprocal. Thereby, RF switch components can be directly considered in SSK transmission. Such RF switches are generally very inexpensive. The RF switching time including the rise and fall times of a pulse, $T_{sw}$, plays a major role in determining the maximum data rate of the SSK scheme. The maximum data rate that can be transmitted in the SSK scheme is given by:

$$R_b = \eta/T_{sw} \, b/s/Hz. \tag{3}$$

Hence, a slow switching time degrades the spectral efficiency of the SSK scheme, whereas a fast switching time achieves increased data rates. A recent study investigated the impact of RF switches on the achievable data rate of the SM system. Different RF switches are available commercially with various switching times ranging from about 20 nanoseconds (ns) to a few microseconds (µs). Thus, a maximum data rate of 50 Mbps can be achieved for an SSK scheme with $N_t=2$ antennas through such switches if the channel bandwidth allows for such a data rate. It should be noted also that there exist several RF switches that can support a different number of transmit antennas. Thus, $N_t=2$, $N_t=4$, $N_t=8$, and $N_t=16$ can be obtained easily with very low cost. The switching time depends on the transistor technology and number of output ports, and generally increases with increasing the number of output ports for the same technology. In some cases, like the 16-output switch, the decoder bit information has to be fed through a serial communication protocol, such as SPI. Therefore, the time overhead introduced by SPI has to be added to the RF switching time.

EXAMPLE 2

Spatial Modulation (SM) Transmitter

Figure 3:
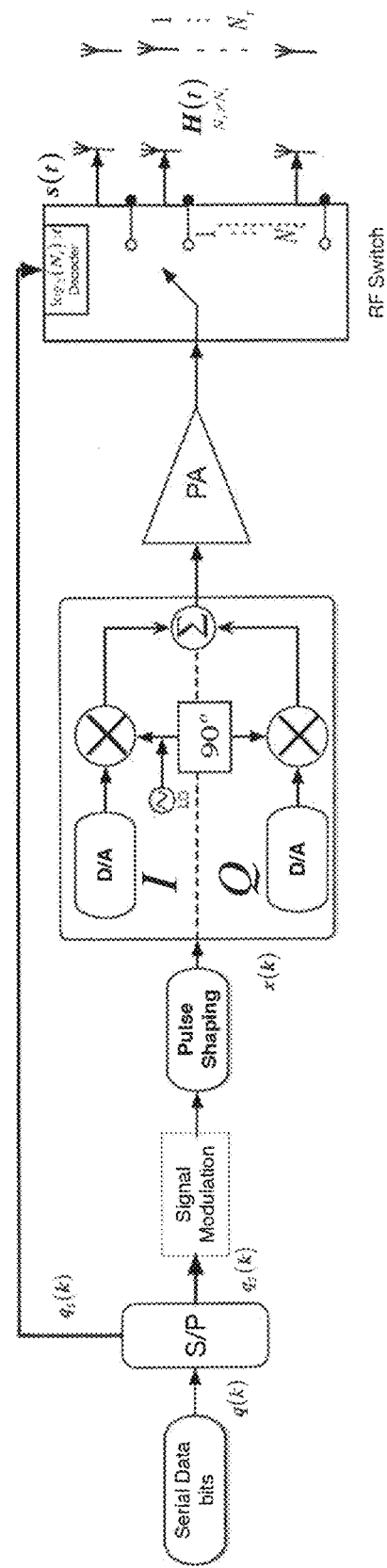
FIG. 3 is a schematic diagram showing the configuration of a design for a single RF chain SM transmitter model with $N_t$ transmit antennas.

FIG. 3 is a schematic diagram showing the configuration of a design for a single RF chain SM transmitter model with $N_t$ transmit antennas. SM is similar to the SSK scheme, except that the carrier signal is now modulated by a constellation complex symbol driven from an arbitrary M-QAM/PSK constellation diagram. Therefore, SM can be considered as a generalization of the SSK system by transmitting a modulated carrier.

As illustrated in FIG. 3, incoming data with a spectral efficiency of $\eta=\log_2(MN_t)$ are first converted to a parallel data stream, where M denotes the size of the constellation diagram. Similar to the SSK scheme, $\log_2(N_t)$ bits control the RF switch and determine the active antenna index at each particular time instant. In addition, $\log_2(M)$ bits modulate a complex symbol, $x=x_\Re+jx_\Im$ from an arbitrary constellation, with $x_\Re$ denoting the real part of the complex symbol, $x_\Im$ denoting the imaginary part of the symbol, and $j=\sqrt{(-1)}$. The complex symbol is applied to the pulse shaping filter, which, in turn, modulates the RF carrier signal through an IQ modulator, resulting in the signal $x(t)=x_\Re \cos(2\pi f_c t)+x_\Im \sin(2\pi f_c t)$. The signal $x(t)$ will be transmitted from the active transmit antenna selected by the RF switch.

Figure 4:
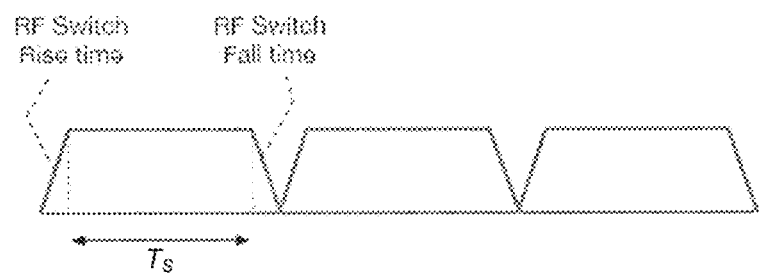
FIG. 4 is a schematic diagram showing a transmitted SM pulse including RF switching time, Tt, and symbol time, Ts.

FIG. 4 is a schematic diagram showing a transmitted SM pulse, including RF switching time, $T_{sw}$, and symbol time, Ts. Assuming that the symbol time for $x(t)$ is $T_s$, the overall transmitted symbol has a pulse width of $T=T_s+T_{sw}$, and a demonstration for such a pulse is depicted in FIG. 4. As illustrated before, the switching time is shown to degrade the overall data rate of the SM system, although RF switching on the pulse shaping filter will affect performance.

EXAMPLE 3

Quadrature Space Shift Keying (QSSK) Transmitter

Figure 5:
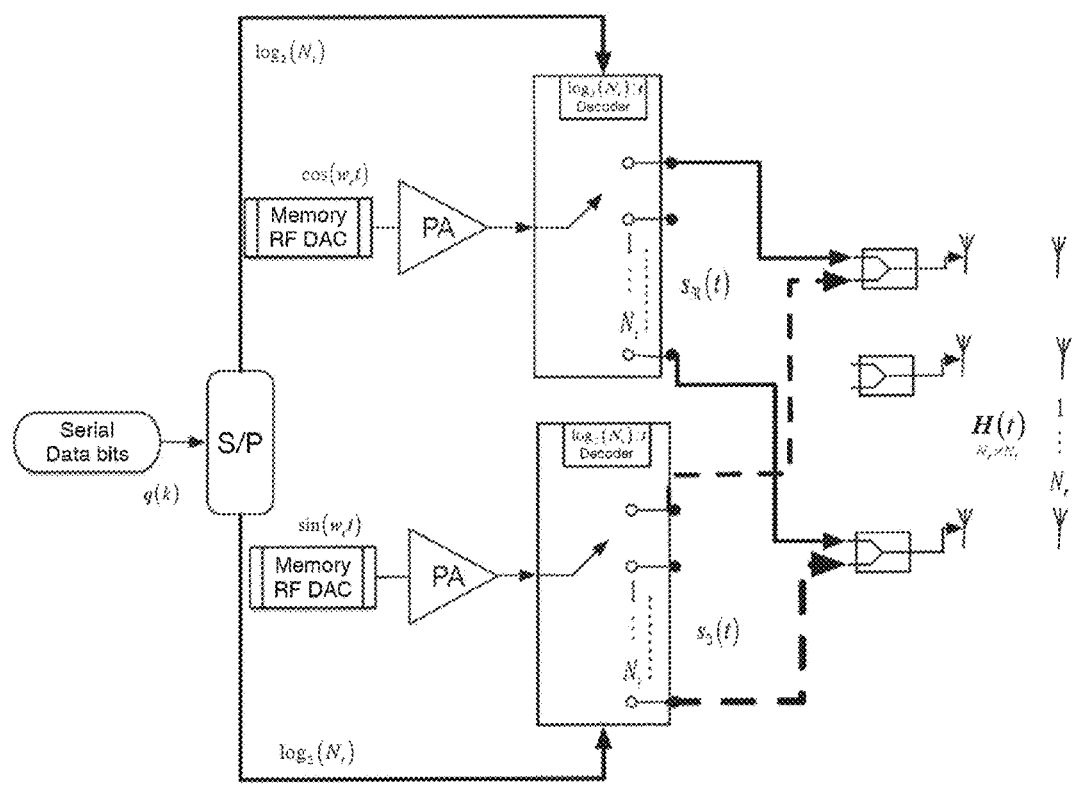
FIG. 5 is a schematic diagram showing the configuration of a design for a QSSK system model.

FIG. 5 is a schematic diagram showing the configuration of a design for a QSSK system model. QSSK is proposed to enhance the spectral efficiency of the SSK scheme by expanding the spatial constellation diagram to include a quadrature dimension, in addition to the in-phase one. As such, it can be seen as two orthogonal spatial pulse amplitude modulation (PAM) scheme.

QSSK is similar to an SSK scheme, as no RF chain is required for QSSK as well. However, two RF switches are needed. In the SSK system, either the cosine or the sine part of the carrier signal is transmitted. Yet, QSSK utilizes both parts of the unmodulated RF carrier signal (the in-phase and the quadrature part) to increase the data rate and enhance the performance of the SSK scheme. In the SSK scheme, the RF signal transmitted by the single active transmit antenna is constant and is either $x(t)=\cos(w_c t)$ or $x(t)=\sin(w_c t)$. Whereas in QSSK system, two transmit antennas might be active at one time instant and the transmitted RF signal is $x(t)=\cos(w_c t)+\sin(w_c t)$. The first RF switch determines the antenna, $l_\Re$, that will transmit $\cos(w_c t)$, while the second RF switch determines the antenna, $l_\Im$, that will transmit $\sin(w_c t)$. Hence, the spectral efficiency of QSSK is given by $\eta=\log_2(N_t^2)$, which represents a $\log_2(N_t)$ enhancement over the SSK system.

It is noted that the cosine and the sine parts of the carrier signal are orthogonal, and transmitting them simultaneously causes no inter-channel interference (ICI), similar to the SSK and SM algorithms. In fact, they are already transmitted at the same time in the SM system, but from a single transmit antenna. Even though two transmit antennas might be active at a time, no RF chain is needed, as in the SSK scheme. Hence, all inherent features of the SSK scheme are retained, but with an additional $\log_2(N_t)$ bits that can be transmitted. However, the transmit antennas must be synchronized to start the transmission simultaneously. Synchronizing the transmit antennas is a simple process and can be enforced through driving the RF switches from the same reference clock.

It should be mentioned also that it is possible to have $l_\Re=l_\Im$, depending on the sequence of incoming data bits. Therefore, the two RF switches might activate the same antenna at a particular time instant. Hence, an RF coupler is needed at the input of each transmit antenna. The RF coupler combines the RF signals from identical outputs of each RF switch. Activating the first output of the RF switch indicates that the incoming bit sequence is "00", and the first transmit antenna must be active at this time instant. If the input bits to the second RF switch was also "00", then the second switch will also activate the first transmit antenna, and the output of the two RF switches will be coupled in order to be transmitted from the first transmit antenna. RF couplers are passive components that are available with wide frequency range, high quality and low cost.

EXAMPLE 4

Quadrature Spatial Modulation (QSM) Transmitter

Figure 6:
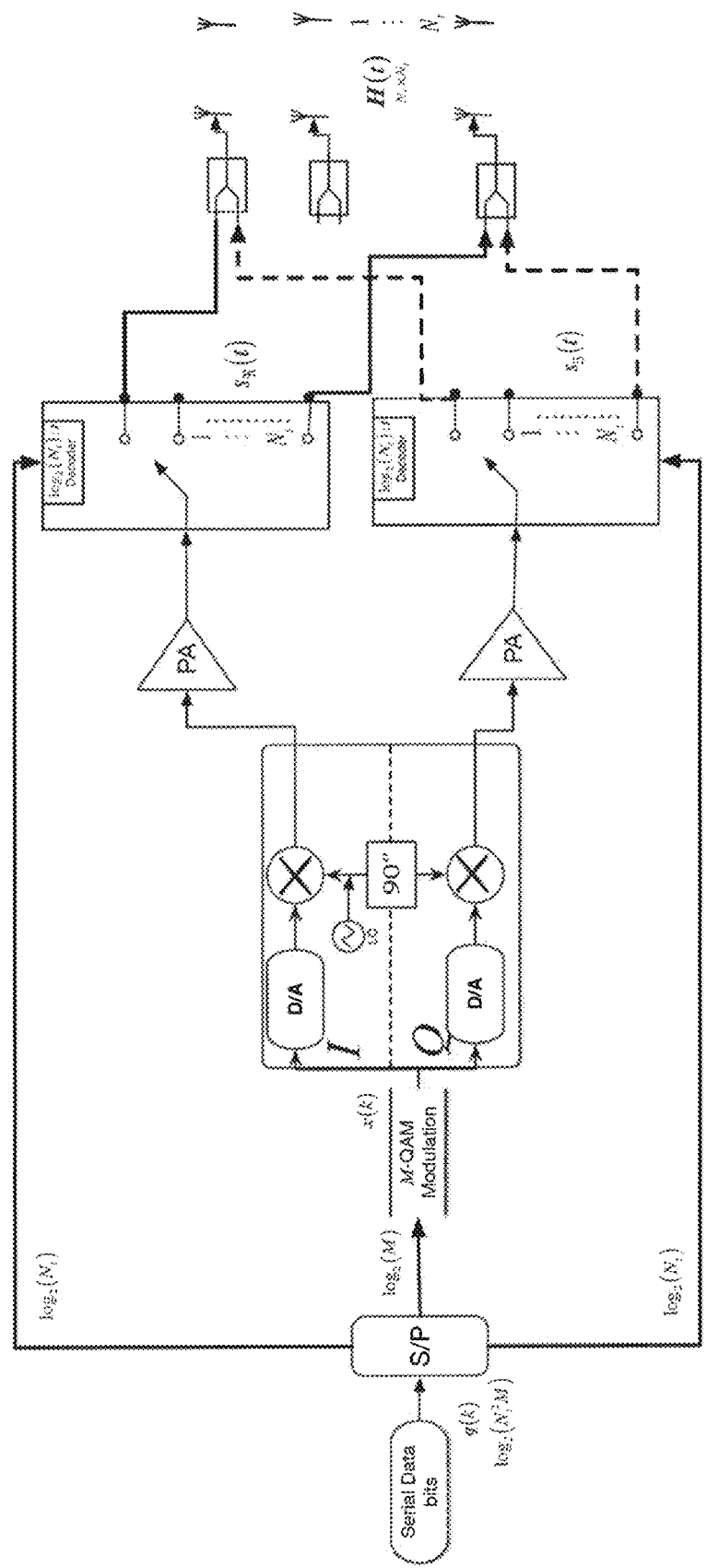
FIG. 6 is a schematic diagram showing the configuration of a design for a QSM transmitter system model with single RF chain, two RF switches, $N_t$ transmit antennas and $N_r$ receive antennas.

FIG. 6 is a schematic diagram showing the configuration of a design for a QSM System Model with a single RF chain, two RF switches, $N_t$ transmit antennas and $N_r$ receive antennas. QSM is an amendment to the SM system by utilizing the quadrature spatial dimension, similar to QSSK, with the difference that the transmitted RF carrier signal is now modulated. Hence, some of the incoming data bits modulate an arbitrary M-QAM/PSK complex constellation diagram, which, in turn, modulates the RF carrier signal. A system model for QSM system is shown in FIG. 6. Similar to SM, QSM can be implemented with single RF chain, even though two transmit antennas might be active at one time instant.

The data bits that can be transmitted at one time instant in QSM system is $\eta=\log_2(N_t^2 M)$ bits. The incoming bits are partitioned to three groups. The first one contains $\log_2(M)$ bits and is used to modulate a complex data symbol, $x=x_\Re+jx_\Im$, from an arbitrary M-QAM/PSK constellation diagram. The second two groups each with $\log_2(N_t)$ bits determine the indexes of two active antennas $l_\Re$ and $l_\Im$. The first antenna, $l_\Re$, will transmit the real part of the complex symbol $x_\Re$, whereas the second antenna will be transmitting the imaginary part of the complex symbol $x_\Im$. The output from the RF chain is given by:

$$x_{RF}=x_\Re \cos(w_c t)+x_\Im \sin(w_c t) \quad (4)$$

The cosine part of the carrier modulated by $x_\Re$ is transmitted from antenna $l_\Re$ through the first RF switch, and the sine part of the carrier is transmitted from antenna $l_\Im$ through the second RF switch.

Similar to QSSK scheme, it is possible to have $l_\Re=l_\Im$ if identical spatial bits are to be transmitted at one time instant. Hence, one transmit antenna might be active at that specific time instant. To facilitate this, RF combiners are needed to connect the identical outputs from the RF switches to the corresponding antenna, as shown in FIG. 6.

EXAMPLE 5

Spatial Multiplexing (SMX) (Prior Art)

Figure 7:
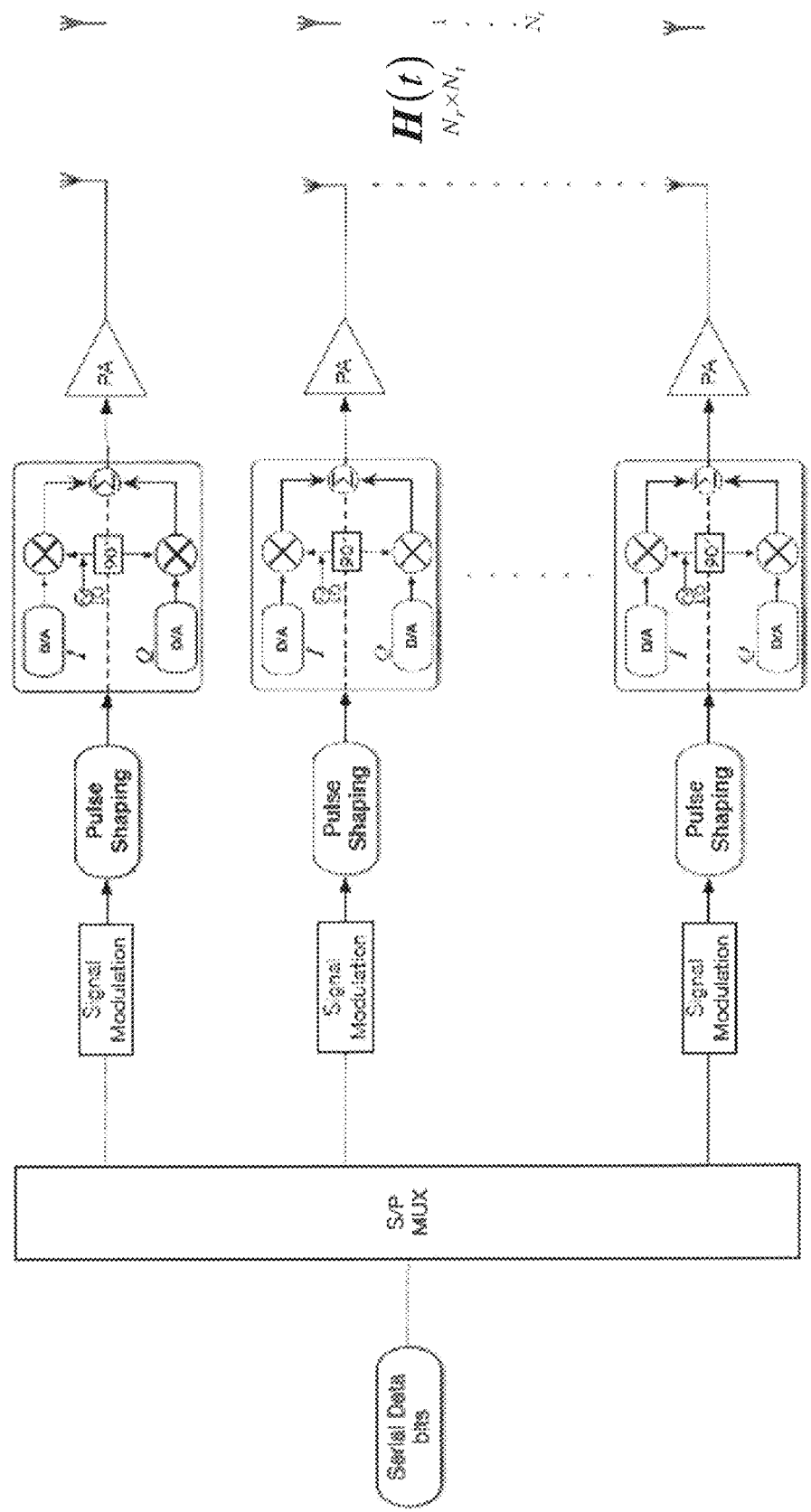
FIG. 7 is a schematic diagram showing the configuration of a design for an SMX System Model of the prior art with $N_t$ RF chain and $N_r$ receive antennas.

FIG. 7 is a schematic diagram showing the configuration of a design for an SMX System Model with $N_t$ RF chain and $N_r$ receive antennas. SMX is considered as a reference MIMO technique, since it is widely adopted in several systems and is the main technology in 4G wireless standard. In SMX, $\eta=N_t \log_2(M)$ serial data bits are converted to parallel data streams each with $\log_2(M)$ bits that will be transmitted at one time instant using the same carrier frequency. Each data stream is modulated through M-QAM modulators and applied to the transmit RF chain. Assuming synchronized transmit antennas, all modulated RF data are transmitted simultaneously from the available $N_t$ antennas, as shown in FIG. 7.

EXAMPLE 6

Maximum Likelihood (ML) Receiver

The generated RF signal from the transmitter for each of the previously discussed MIMO techniques is transmitted over the MIMO channel matrix H, which can be regarded as a flat Rayleigh fading channel. The received signals are then demodulated through an IQ demodulator and processed by the optimum ML decoder to retrieve the source bits. The optimum ML detector can be used to decode the transmitted messages as:

$$\hat{x} = \underset{x_i \in X}{\arg\min} \|y - Hx_i\|_F^2 \qquad (5)$$

where $\hat{x}$ denotes the estimated transmitted symbol, $\|\cdot\|$ is the Frobenius norm, $x_i$ is a possible transmitted vector from X, and X is a set containing all possible transmitted vectors combinations between transmit antennas and data symbols.

For instance, consider $N_t=2$ and M=4-QAM modulation order, then:

$$X^{\{SSK\}} = \begin{Bmatrix} 1 & 0 \\ 0 & 1 \end{Bmatrix}$$

$$X^{\{SM\}} = \begin{Bmatrix} 1+j & j & 1-j & 0 & -1-j & 0 & -1+j & 0 \\ j & 1+j & 0 & 1-j & 0 & -1-j & 0 & -1+j \end{Bmatrix}$$

and $$X^{\{QSSK\}} = \begin{Bmatrix} 1 & j & 1+j & 0 \\ j & 1 & 0 & 1+j \end{Bmatrix}.$$

A similar set can be formed for QSM and SMX, and follows the same format, but contains a matrix with 2 rows and 16 columns.

The ML decoder in equation (5) searches the transmitted vectors space and selects the vector that is closest to the received signal vector y as the most probable transmitted vector. The closer the two vectors from the set X to each other, the higher the probability of error. Also, the computational complexity of encoding and decoding should be practical, while taking into consideration that systems with higher complexity tend to perform better.

EXAMPLE 7

Average Bit Error Probability

The average BER for all of the presented schemes can be evaluated using the tight union bounding technique as:

$$\overline{P}_b = \frac{1}{2^{\eta+1}} \sum_{i=1}^{2^\eta} \sum_{j=1}^{2^\eta} Pr(x_i \to x_j) e_{i,j}, \qquad (6)$$

where $Pr(x_i \to x_j)$ denotes the pair-wise error probability (PEP) of $x_i$ being transmitted given that $x_j$ is received, and $e_{i,j}$ is the Hamming distance of the corresponding PEP event.

The PEP is given by:

$$Pr(x_i \to x_j | H) = Pr(\|y - Hx_i\|_F^2 > \|y - Hx_j\|_F^2 | H) \qquad (7)$$

$$= Q\left(\sqrt{\overline{\gamma} \|H\Psi\|_F^2}\right)$$

$$= \frac{1}{\pi} \int_0^{\pi/2} \exp\left(-\frac{\overline{\gamma} \|H\Psi\|_F^2}{2\sin^2\theta}\right) d\theta.$$

where $\Psi = x_i - x_j$. Rewriting equation (7) using the moment generation function (MGF) gives:

$$Pr(x_i \to x_j | H) = \frac{1}{\pi} \int_0^{\pi/2} \Phi\left(-\frac{\overline{\gamma}}{2\sin^2\theta}\right) d\theta, \qquad (8)$$

where $\Phi(\bullet)$ denotes the MGF of $\|H\Psi\|_F^2$.

The Frobenius norm of $\|H\Psi\|_F^2$ can be expanded as:

$$\|H\Psi\|_F^2 = \operatorname{trac}(H\Psi\Psi^H H^H)$$

$$= vec(H^H)^H (I_{N_r} \otimes \Psi\Psi^H) vec(H^H)$$

$$= vec(H^H)^H (I_{N_r} \otimes \Psi\Psi^H) vec(H^H)$$

$$= \omega^H \xi \omega \qquad (9)$$

where $\omega = vec(H^H)$ and $\xi = (I_{N_r} \otimes \Psi\Psi^H)$. The MGF of the Hermitian matrix $\vartheta = \omega^H \xi \omega$ with $\omega$ being a complex random vector with mean $\overline{\omega}$ and covariance matrix $\gamma$ is shown to $$\Phi_\vartheta(s) = \frac{\exp(s\overline{\omega}\xi(I - sY\xi)^{-1}\overline{\omega})}{\det(I - sY\xi)} \qquad (10)$$

$$\Phi_\vartheta(s) = \frac{\exp\left(vec(\overline{H}^H)^H \chi(I_{N_r N_t} - sY\xi)^{-1} vec(\overline{H}^H) s\right)}{\det(I_{N_r N_t} - sY\xi)}$$

where $\overline{H}$ denotes the mean value of the channel matrix, and for a Rayleigh fading channel is zero.

Substituting equation (10) in equation (8) gives:

$$Pr(x_i \to x_j | H) = \qquad (11)$$

$$\int_0^{\pi/2} \frac{\left(-\frac{\overline{\gamma}}{2\sin^2\theta} vec(\overline{H}^H)^H \xi \left(I_{N_r N_t} + \frac{\overline{\gamma}}{2\sin^2\theta} Y\xi\right)^{-1} vec(\overline{H}^H)\right)}{\pi \det\left(I_{N_r N_t} + \frac{\overline{\gamma}}{2\sin^2\theta} Y\xi\right)} \leq$$

$$\frac{1}{2} \frac{\exp\left(-\frac{\overline{\gamma}}{2} vec(\overline{H}^H)^H \xi \left(I_{N_r N_t} + \frac{\overline{\gamma}}{2} Y\xi\right)^{-1} vec(\overline{H}^H)\right)}{\det\left(I_{N_r N_t} + \frac{\overline{\gamma}}{2} Y\xi\right)}.$$

Figure 8:
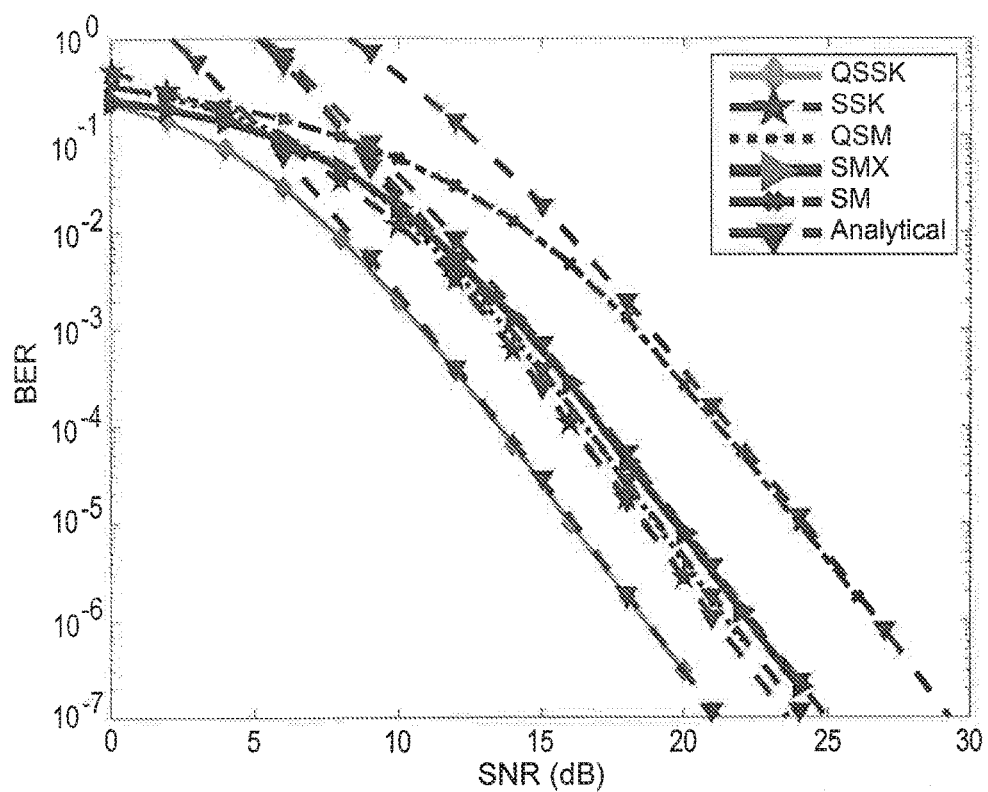
FIG. 8 is a plot showing a comparison of the average bit error rate (BER) as a function of Signal to Noise Ratio (SNR) for QSSK, SSK, QSM, SMX and SM systems for different number of transmit antennas and modulation orders achieving $\eta=8$ bps/Hz and with $N_r=4$ antennas.

FIG. 8 is a plot showing the average bit error rate (BER) performance comparison between QSSK, SSK, QSM, SMX and SM systems for different numbers of transmit antennas and modulation orders achieving $\eta=8$ bps/Hz and with $N_r=4$ antennas. The average bit error rate (BER) results for all systems assuming $\eta=8$ bps/Hz is evaluated numerically through Monte Carlo simulations and computed analytically using equation (6). FIG. 8 depicts the results. For simulation results, at least $10^6$ bits are transmitted for each depicted SNR value, and SNR is varied from 0 to 30 dB. First, analytical and simulation results are shown to match closely for a wide and pragmatic SNR range, which validates the conducted derivations. It can be seen from FIG. 8 that the QSSK system achieves the best performance as compared to all other systems. It should be noted that QSSK uses $N_t=16$ to achieve $\eta=8$ bps/Hz, while SSK needs $N_t=256$, SM requires $N_t=8$ and $M=8$, QSM needs $N_t=8$ and $M=4$, and SMX uses $N_t=8$ and $M=2$. Different configurations can be expected to lead to different performance. The performance of all these systems in terms of BER, cost, power consumption and receiver complexity are presented for the similar configurations. QSSK is shown to outperform SSK by about 3 dB. SSK, QSM and SMX are shown to have nearly similar performance, with slight degradation of QSM and SMX as compared to SSK. SM is shown to have the least satisfactory performance, and QSSK outperforms SM by about 7 dB.

EXAMPLE 8

Power Consumption

In calculating the approximate transmitter power consumption for all of the above schemes, the EARTH power model is considered. The EARTH power model describes the relation between the total power supplied or consumed by a transceiver system and the RF transmit power. It is assumed that all SMTs will consider SPDT (single-pole, double-throw) RF switches, and the number of switches vary for each scheme to configure the target spectral efficiency. Hence, the consumed power by the RF switches in SMTs system is:

$$P_t^{\{RF-SW\}} = P_{SW} \log_2(N_t) \quad (12)$$

where $P_t^{\{RF-SW\}}$ is the total consumed power by a SMT system having $\log_2(N_t)$ SPDT RF switches and $P_{SW}$ is the consumed power by a single RF switch.

Through the EARTH model, the power consumption for SMX, SSK, SM, QSM, and QSSK systems is calculated as follows:

$$P_t^{\{SMX\}} = (P_o N_t) + (\alpha P_{max})$$

$$P_t^{\{SSK\}} = (\alpha P_{max}) + P_t^{\{RF-SW\}}$$

$$P_t^{\{QSSK\}} = (\alpha P_{max}) + P_t^{\{RF-SW\}}$$

$$P_t^{\{SM\}} = (P_o) + (\alpha P_{max}) + P_t^{\{RF-SW\}}$$

$$P_t^{\{QSM\}} = (P_o) + (\alpha P_{max}) + P_t^{\{RF-SW\}} \quad (13)$$

where $P_o$ denotes the minimum consumed power per RF chain, $\alpha$ is the slope of the load dependent power consumption, and $P_{max}$ is the total RF transmit power.

In the examples that follow, the following parameters may be assumed: $P_o=53$ W, $\alpha=3.1$, and $P_{max}=6.3$ W. In addition, it is noted that even though $P_t^{\{SM\}}$ and $P_t^{\{QSM\}}$ have the same formula, the total consumed power is not equal, since the number of required RF chains to achieve the target spectral efficiency in not the same. Similarly, $P_t^{\{SSK\}}$ and $P_t^{\{QSSK\}}$ are not equal.

Figure 9:
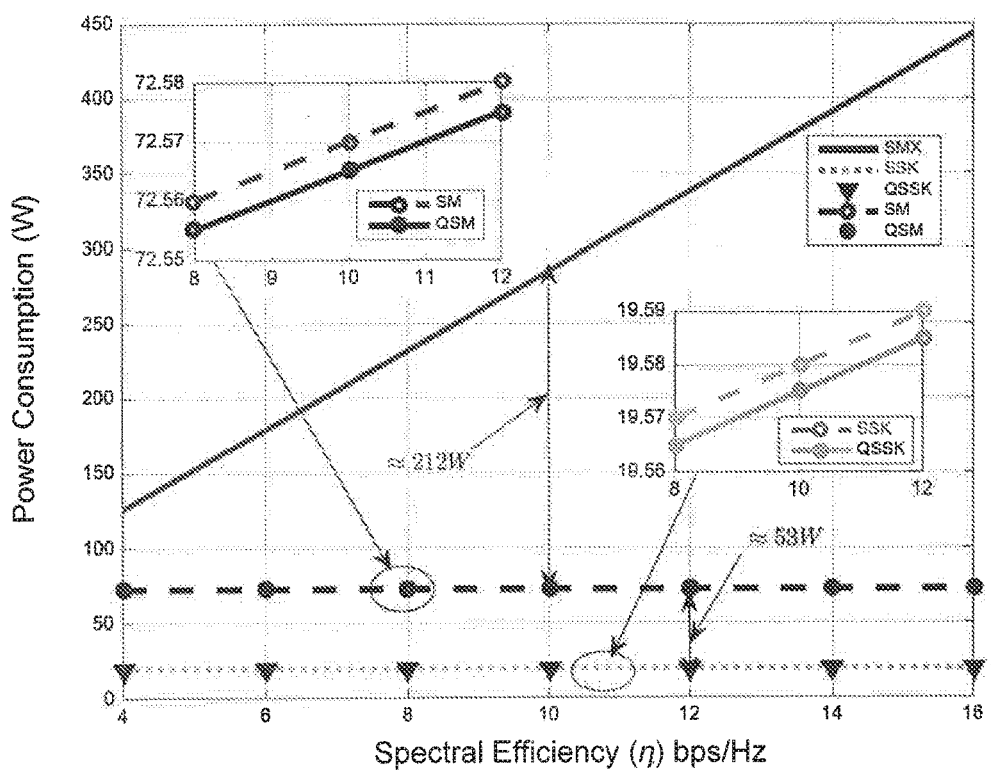
FIG. 9 is a plot showing transmitter power consumption for SMX, SM, QSM, SSK and QSSK MIMO systems.

FIG. 9 is a plot showing transmitter power consumption for SMX, SM, QSM, SSK and QSSK MIMO systems. For SM, QSM and SMX, $M=4$ is assumed. The diagram considers the effect of SPDT RF switches for the SMTs. The consumed power by each system is depicted versus the target spectral efficiency, which is varied from 4~16 bps/Hz. For SM, QSM, and SMX, $M=4$ is assumed, and the required number of transmit antennas to achieve the spectral efficiency is computed and used in the power consumption analysis. In addition, for all SMTs, SPDT switches are considered, and the number of needed switches varies with the number of transmit antennas. It is revealed that SSK and QSSK consumes the least amount of power, while SM and QSM require 53 W more than SSK and QSSK. In addition, SMX needs 212 W more power than SM and QSM. It should be noted, though, that QSM and QSSK require slightly less power that SSK and SM, respectively, since they need fewer transmit antennas, which, in turn, means fewer RF switches.

EXAMPLE 9

Complexity Results

Figure 10:
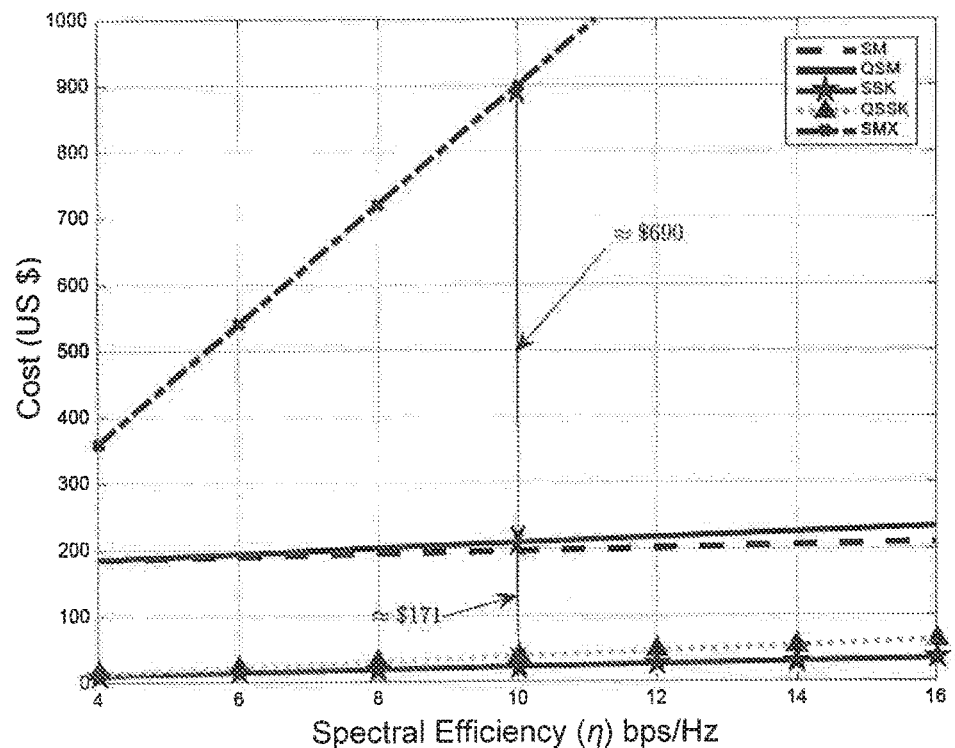
FIG. 10 is a plot showing exemplary transmitter implementation costs for SMX, SM, QSM, SSK, and QSSK.

The Maximum Likelihood Receiver Complexity is shown in FIG. 10. While the plot is depicted for a specific set of system configurations, the results are believed to be applicable for receiver computational complexity for all systems. It is observed that SSK and QSSK require similar computational complexity for the same spectral efficiency. Similarly, QSM and SM are shown to have the same complexity for the same $\eta$. SMX is shown to require much higher complexity, and almost an order of magnitude increase can be clearly noticed when compared to SSK and QSSK systems.

EXAMPLE 10

Hardware Cost

A rough estimate for the transmitter implementation cost for each presented system can be calculated. Let (1) $C_{RF}$=the cost of one RF chain; (2) $C_{memory}$=the cost of a memory module, such as a microcontroller with a DAC chip; (3) $C_{S/P}$=the cost of a serial to parallel converter; and (4) $C_{SW}$=the cost of one RF switch.

Then, the cost of the required hardware items to implement the transmitter for the disclosed systems is:

$$C^{\{SMX\}} = (C_{RF} + C_{PA})N_t$$

$$C^{\{SSK\}} = C_{memory} + C_{PA} + C_{S/P} + (C_{SW}N_t)$$

$$C^{\{QSSK\}} = C_{memory} + 2C_{PA} + C_{S/P} + 2(C_{SW}N_t)$$

$$C^{\{SM\}} = C_{RF} + C_{PA} + C_{S/P} + (C_{SW}N_t)$$

$$C^{\{QSM\}} = C_{RF} + 2C_{PA} + C_{S/P} + 2(C_{SW}N_t). \quad (14)$$

FIG. 10 is a plot showing example transmitter implementation costs for SMX, SM, QSM, SSK, and QSSK. The diagram assumes $M=4$ and SPDT RF switches. A rough estimate of the cost for deploying the transmitter for each of the considered systems is illustrated in the figure. Similar trends resulting from the power consumption are seen here as well. $M=4$ is assumed for SM, QSM, and the effect of SMX and SPDT RF switches is considered for the SMTs.

Implementing an SMX transmitter can be expensive, as it requires a number of RF chains equal to the number of transmit antennas. Hence, the cost increases linearly with the spectral efficiency. In contrast, SSK and QSSK present a simple design, and therefore their cost implementations become almost negligible.

EXAMPLE 11

Receiver Computational Complexity

The required numbers of complex operations to compute equation (5) for each system are given by:

$$\mathbb{C}_{\{SMX\}} = 4(N_t+1)N_r 2^{N_t \log_2(M)}$$

$$\mathbb{C}_{\{SSK\}} = 4N_r 2^{\log_2(N_t)}$$

$$\mathbb{C}_{\{QSSK\}} = 4N_r 2^{\log_2(N_t^2)}$$

$$\mathbb{C}_{\{SM\}} = 8N_r 2^{\log_2(MN_t)}$$

$$\mathbb{C}_{\{QSM\}} = 8N_r 2^{\log_2(MN_t^2)} \quad (15)$$

Figure 11:
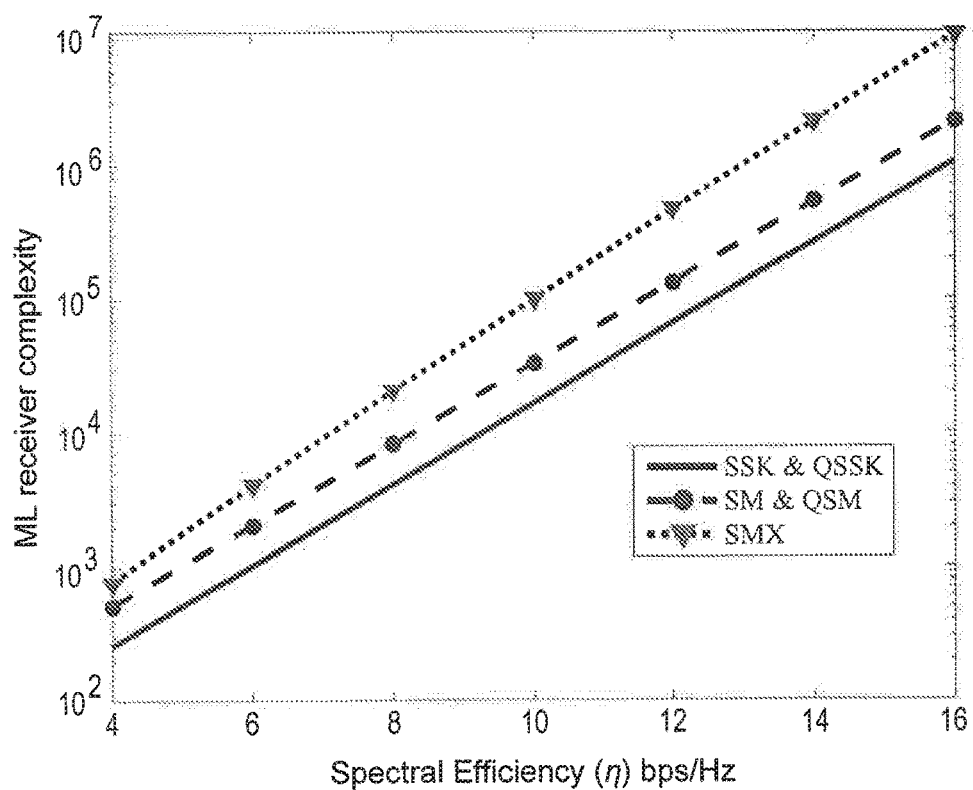
FIG. 11 is a plot showing exemplary receiver computational complexity for SMX, SM, QSM, QSSK, and SSK.

FIG. 11 is a plot showing example receiver computational complexity for SMX, SM, QSM, QSSK, and SSK. The diagram assumes $N_r$=4 antennas.

EXAMPLE 12

GQSSK Transmitter

QSSK is proposed as an enhancement to the SSK system by adding a new spatial constellation dimension. In the SSK system described above, M=log$_2$(N$_t$) bits, with N$_t$ denoting the number of transmit antennas, modulate a spatial constellation symbol at each particular time instant. The spatial symbol, $l \in \{1: N_t\}$, is the index of one of the available transmit antennas that will be used at this particular time to transmit either the in-phase or the quadrature component of a carrier signal. The transmitted signal is unmodulated and data bits are solely conveyed through modulating spatial symbols. In QSSK, m=log$_2$ (N$_t^2$) bits are transmitted at each time instant, where an additional base two logarithm of the number of transmit antennas bits are modulated as compared to SSK. Such data rate enhancement is accomplished through modulating two spatial symbols, $l_\Re \in \{1: N_t\}$ and $l_\Im \in \{1: N_t\}$, that will be used to respectively transmit the in-phase and the quadrature parts of the carrier signal. In other words, the transmit antenna with index $l_\Re$ will be transmitting the signal cos(2πf$_c$t) and the other antenna with index $l_\Im$ will transmit sin(2πf$_c$t). Hence, the two transmitted signals are orthogonal and all inherent advantages of the SSK scheme are retained, but with doubling the spectral efficiency.

Following similar principles, GQSSK can be defined according to $N_u$, where $N_u$ is the number of activated antennas (activated antennas in use). GQSSK can therefore be defined by allowing $N_u$>1 transmit antennas to be activated at each time instant. As such, an arbitrary number of transmit antennas, not necessarily a power of two, as in QSSK, can be considered. In particular, 1<$N_u$<$N_t$ transmit antennas are activated at a time to transmit the in-phase part of the carrier signal, and another subset is activated to transmit the quadrature part of the carrier. Therefore, the number of data bits that can be transmitted in GQSSK scheme is m=⌊log$_2$(N$_t$/N$_u$)⌋, where ⌊•⌋ denotes the floor operation.

To illustrate this, by way of non-limiting example, let $N_t$=3 and $N_u$=2. The number of data bits that can be transmitted at one time instant is M=2 bits/s/Hz. Assume the following data bits to be transmitted at one time instant: q[k]=[0 1]$^T$, with (•)$^T$ denoting the transpose operation. Now, let the possible combinations of transmit antennas taking $N_u$ antennas at a time be={{1,2}, {1,3}, {2,3}}. Any two combinations from the set S can be considered. For illustration purposes, let us consider χ={{1,2}, {2,3}}. The first message bit "0" modulates the index $l_\Re$=1∈{χ}, indicating that antennas "1" and "2" will be transmitting cos(2πf$_c$t). The second bit, "1" modulates antenna index $l_\Im$=2∈{χ}, which means that antennas "2" and "3" will be transmitting sin(2πf$_c$t). As such, the resultant transmit vector is given by:

$$x = \frac{1}{\sqrt{2}} [\cos(2\pi f_c t) \; \cos(2\pi f_c t) + \sin(2\pi f_c t) \; \sin(2\pi f_c t)]^T.$$

This can be written in baseband domain as:

$$x = \left[ \frac{1}{\sqrt{2}} \; \frac{1}{\sqrt{2}} + j\frac{1}{\sqrt{2}} \; j\frac{1}{\sqrt{2}} \right]^T,$$

where j=√(−1) and the total transmit power is divided among $N_u$ antennas.

The generated vector is then transmitted over an $N_r \times N_t$ MIMO channel matrix, H, with entries being modeled as a flat Rayleigh fading channel with zero mean and unit variance, $h_{n_r,n_t} \sim$ CN(0, $\sigma_h^2$=1). The received signal vector at the $N_r$ receive antennas is then given by:

$$y = Hx + n, \quad (16)$$

where n is an $N_r$-dimensional complex additive white Gaussian noise (AWGN) vector with zero mean and a covariance matrix of:

$$N_0 I_{N_r},$$

where $N_0$ denotes the noise power spectral density per dimension, and $I_{N_r}$ is an identity matrix with $N_r$ dimension.

EXAMPLE 13

GQSM Transmitter

Similar to GQSSK, GQSM can be defined, which relaxes the number of transmit antennas in the QSM system described above and allows the use of an arbitrary number to transmit a modulated carrier signal. As such, signal and spatial constellation symbols are used in a GQSM system, where variant M-quadrature amplitude modulation (M-QAM)/M-phase shift keying (M-PSK) complex constellation diagrams can be considered, in addition to spatial symbols as discussed for GQSSK. To expatiate further, let us extend the previous example by considering 4-QAM modulation order. The spectral efficiency in this case is given by:

$$m = \log_2(M) + 2\left\lfloor \log_2 \binom{N_t}{N_u} \right\rfloor \text{ bits/s/Hz}.$$

Consider the same number of transmit antennas as discussed in the previous example for GQSSK, $N_t$=3 and $N_u$=2; M=4 bits can be transmitted at one time instant. Let q[k]=[0 1 1 0]$^T$ be the incoming data bits to be modulated at one time instant using the GQSM scheme, where the first two bits modulate spatial symbols and the last two bits modulate a complex symbol from a 4-QAM constellation diagram. The spatial bits are the same as in the previous example and modulate the same spatial symbols. Yet, the last two bits modulate the complex symbol (1−j). Hence, the generated vector is given by:

$$x = \left[ \frac{1}{\sqrt{2}} \; \frac{1}{\sqrt{2}} - j\frac{1}{\sqrt{2}} \; j\frac{1}{\sqrt{2}} \right]^T.$$

EXAMPLE 14

Maximum Likelihood (ML) Receiver for Generalized Transmitters

The received signal vectors in the presence of AWGN are processed and the ML receiver is applied to demodulate the transmitted messages. Let the total transmit power be normalized to unity, $E_s=1$. Then, the average signal to noise ratio (SNR) at each receive antenna is given by $\bar{\gamma}=\frac{1}{2}N_0$. Hence, the optimum ML detector can be used to decode the transmitted messages as:

$$\hat{x} = \underset{x_i \in \chi}{\operatorname{argmin}} \|y - Hx_i\|_F^2, \tag{17}$$

where $\hat{x}$ denotes the estimated transmitted symbol, $\|\Psi\|_F$ is the Frobenius norm, and $x_i$ is a possible transmitted vector from $\chi$, where $\chi$ is a set containing all possible transmitted vector combinations between transmit antennas and data symbols.

EXAMPLE 15

Transmitter Implementations for Different Generalized SMTS (GSMTS)

The required hardware components to implement the transmitters with the minimum number of RF chains for the different GSMTs techniques are addressed in this section. It is revealed that GSSK and GQSSK techniques can be implemented without any RF chains, assuming that RF signals are stored in a memory and continuously used for transmission. On the other hand, GSM and GQSM are shown to require a maximum of a single RF chain to operate, regardless of the number of activated antennas, $N_u$. This is achieved, since the activated antennas transmit the same data signal and the overall power is divided among them.

EXAMPLE 16

Hardware Requirements for Generalized SSK (GSSK)

In the GSSK system, only the in-phase or the quadrature part of the RF carrier signal is transmitted from $N_u$ antennas. The spectral efficiency of this system is:

$$m = \left\lfloor \log_2 \left(\frac{N_t}{N_u}\right) \right\rfloor,$$

where $\lfloor \cdot \rfloor$ denotes the floor operation.

Figure 12:
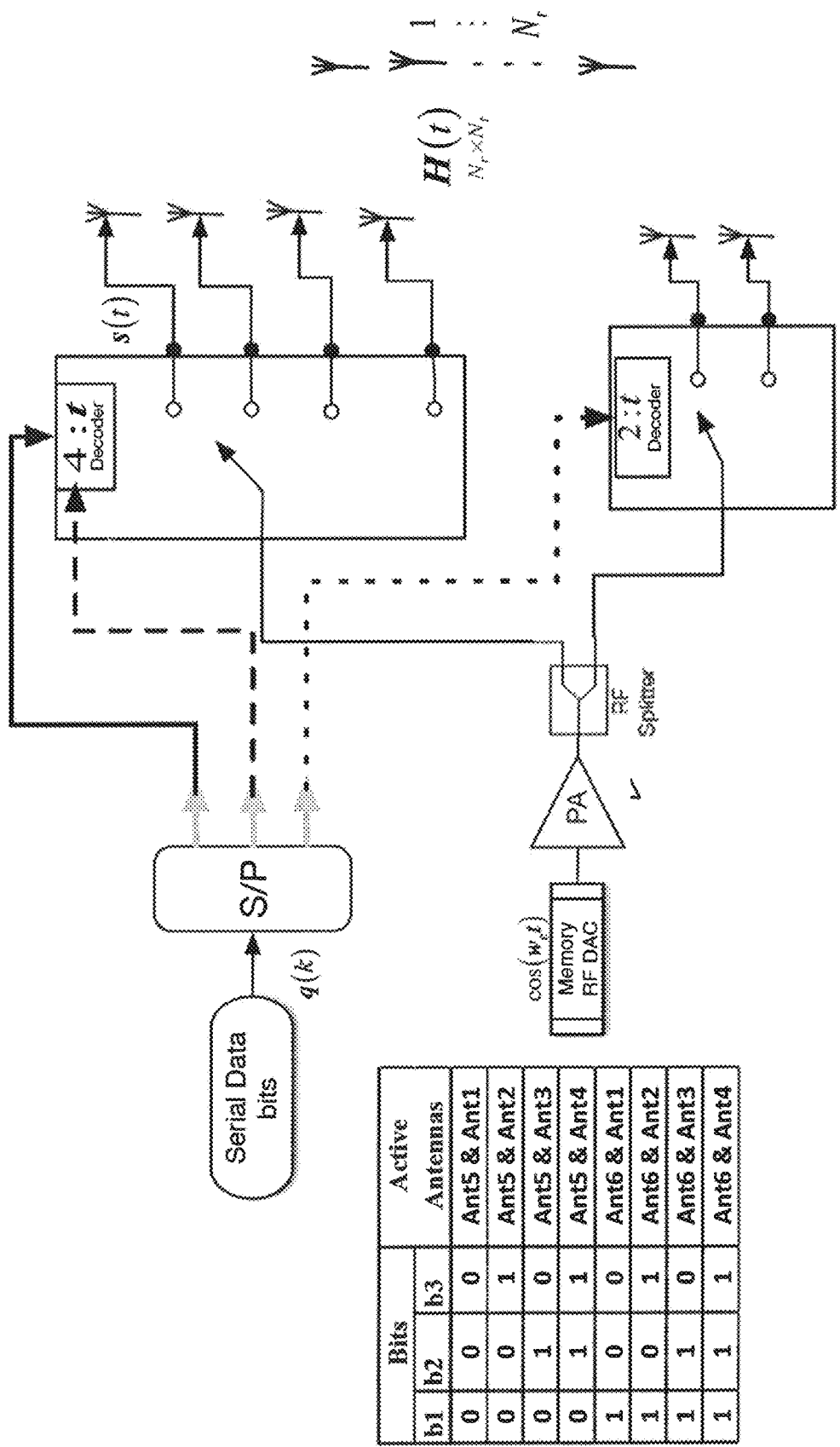
FIG. 12 is a schematic diagram showing the configuration of a GSSK transmitter for $N_t=6$ transmit antennas, along with a mapping table.

FIG. 12 is a schematic diagram showing the configuration of a GSSK transmitter for $N_t=6$ transmit antennas, along with a mapping table. The mapping table is given by way of example, and different mapping tables would lead to different system designs, even with similar hardware components. In the example shown, the mapping table shows $N_t=6$ antennas and $N_u=2$, as depicted in the figure. Hence, M=3 bits/s/Hz can be transmitted during each time instant.

The transmitter design requires no RF chains, and an RF signal, such as $\cos(2\pi f_c t)$ or $\sin(2\pi f_c t)$, is assumed to be generated and stored in a memory to be continuously transmitted from the active $N_u$ antennas. As such, the GSSK transmitter is mainly implemented with RF switches, where two RF switches are needed for the example depicted in FIG. 12. The first switch (with two outputs) selects an antenna based on the most significant bit, b3 (FIG. 12). The other switch (with four outputs) selects an antenna based on the other bits, b2 and b1. Consequently, two transmit antennas are activated at one time instant in the example being considered. In general, $N_u$ antennas among the available $N_t$ antennas can be activated, and the system model can be designed based on the mapping table. In principle, an RF switch with 2M outputs can be considered, or multiple RF switches can be used to support the selections from the mapping table.

It is noted that for M=3 bits, as in the example considered in FIG. 12, $N_t=5$ and $N_u=2$ can theoretically support such spectral efficiency. Such a mapping table requires sophisticated RF switching circuits that can be simplified by considering $N_t=6$ antennas instead of $N_t=5$. It is noted that that there exists several combinations in both scenarios that are not considered. If the channel is known at the transmitter through a feedback link, the selection of the active antennas can be optimized to enhance the performance.

EXAMPLE 17

Hardware Requirements for Generalized SM (GSM)

Figure 13:
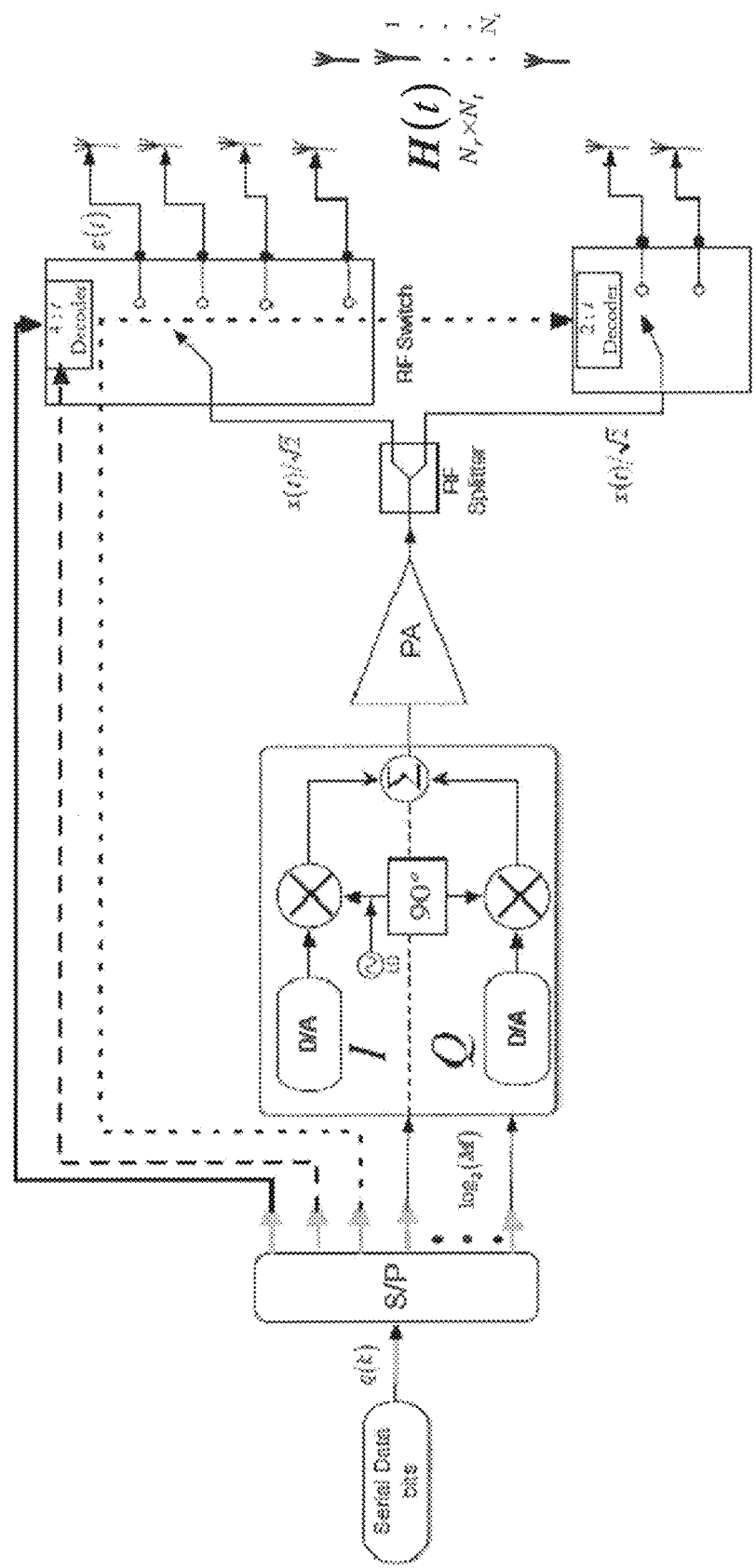
FIG. 13 is a schematic diagram showing the configuration of a GSM system model with single RF chain, multiple RF switches, and with $N_t=6$ transmit antennas and $N_u=2$ active antennas at a time.

Modulating the RF carrier signal in the GSSK system by a complex QAM/PSK symbol leads to GSM technique. FIG. 13 is a schematic diagram showing the configuration of a GSM system model with a single RF chain, multiple RF switches, and with $N_t=6$ transmit antennas and $N_u=2$ active antennas at a time. The number of data bits that can be transmitted in a GSM system that allows $N_u$ antennas to be active among the set of $N_t$ transmit antennas and using M-QAM/PSK modulation is given by:

$$m = \left\lfloor \log_2 \left(\frac{N_t}{N_u}\right) \right\rfloor + \log_2(M). \tag{18}$$

Activating more than one transmit antenna at a time reduces the required number of antennas for a specific spectral efficiency and allows the use of an arbitrary number of antennas. Transmitted energy should be divided among all active antennas, and transmit antennas should be synchronized. Similar to GSSK, the number of transmit antennas can be modestly increased in order to simplify the RF switching circuits. Regardless, a single RF chain is sufficient to implement a GSM transmitter according to this technique. Similar designs can be made for arbitrary number of $N_t$- and $N_u$-utilizing components, such as RF switches, RF splitters and RF combiners.

EXAMPLE 18

Hardware Requirements for Generalized QSSK (GQSSK)

Figure 14:
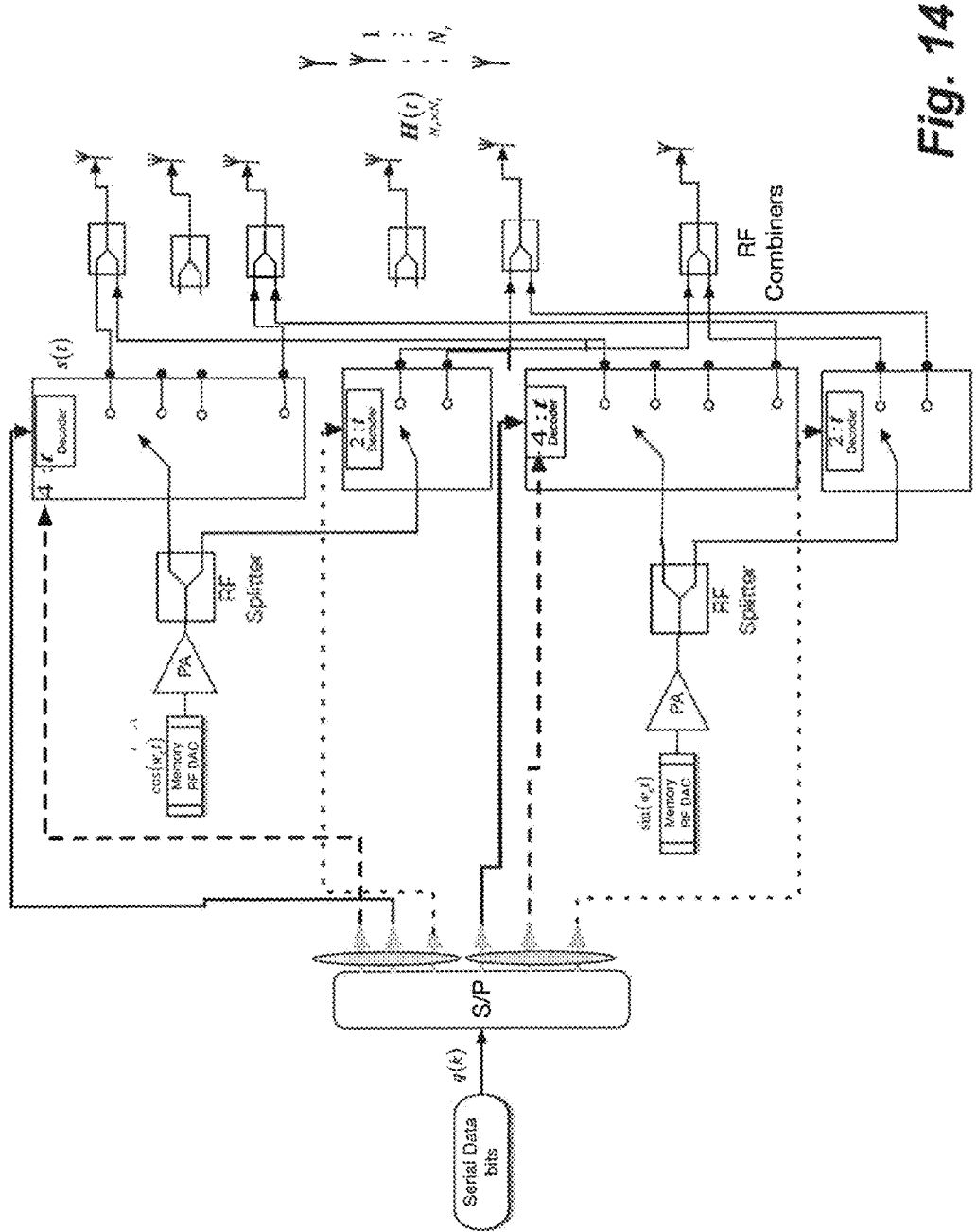
FIG. 14 is a schematic diagram showing the configuration of a GQSSK system model with illustration for $N_t=6$ and $N_u=2$ achieving 9 bits/s/Hz.

FIG. 14 is a schematic diagram showing the configuration of a GQSSK System Model with illustration for $N_t=6$ and $N_u=2$, achieving a spectral efficiency of 6 bits/s/Hz. This configuration is similar to GSSK. For GQSSK, no RF chain is required and the transmitter can be designed through RF switches and some other off-the-shelf components. Besides, it is found that both GSSK and GQSSK require very simple transmitters with a nominal number of hardware components. Hence, the cost to design such transmitters is very marginal and they promise to achieve high power efficiency. However, in GQSSK, and different from GSSK, RF couples are need at the input of each transmit antenna. The need of RF couplers is to facilitate the possibility that one spatial symbol may be modulated by the sequence of incoming data bits to transmit both the in-phase and the quadrature components. This possibility will happen if identical data bits modulate both spatial symbols.

EXAMPLE 18

Hardware Requirements for Generalized QSM (GQSM)

Figure 15:
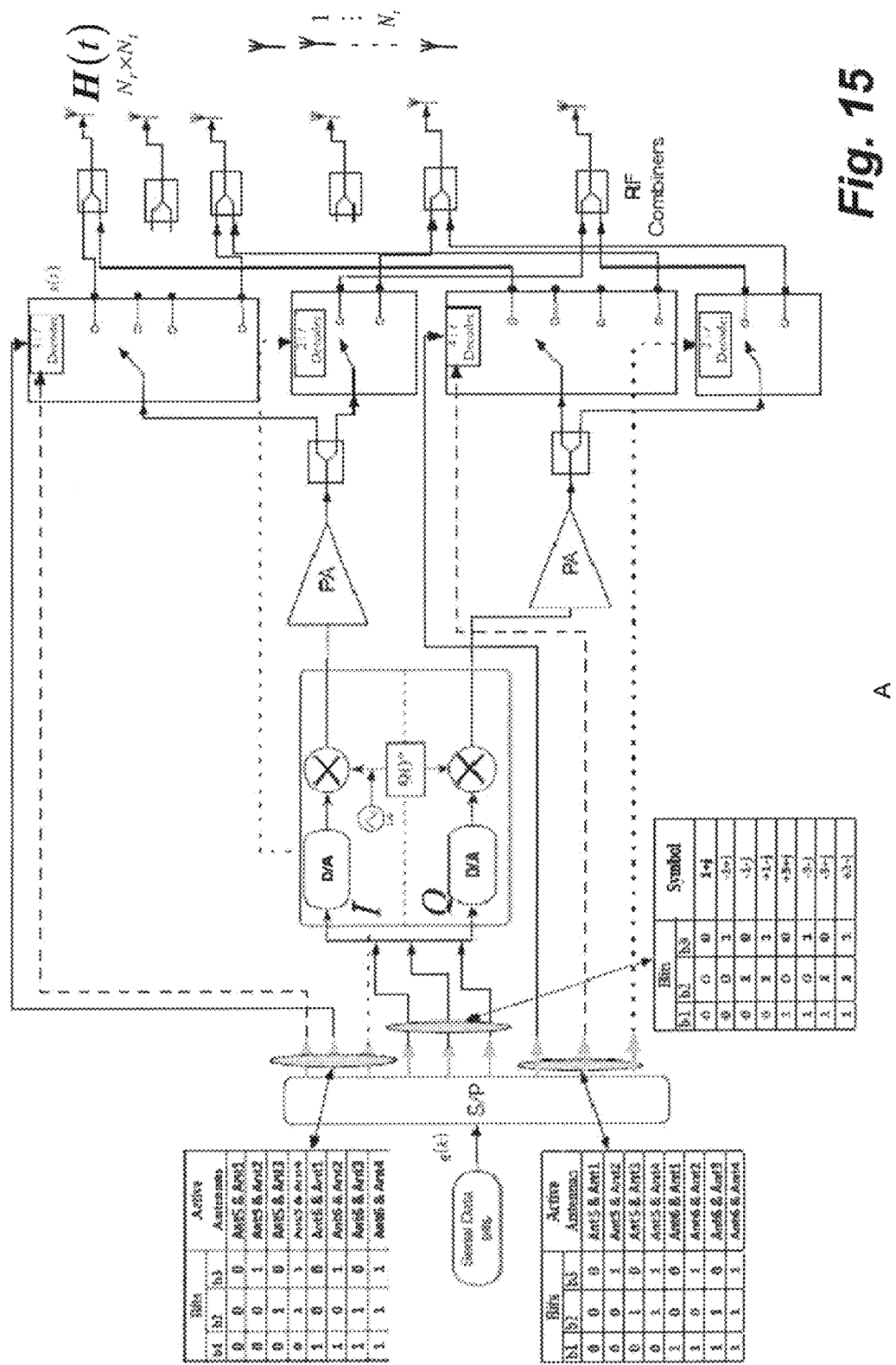
FIG. 15 is a diagram showing the schematic configuration of a GQSM system model with illustration for $N_t=6$ and $N_u=2$ achieving a spectral efficiency of 9 bits/s/Hz.

FIG. 15 is a schematic diagram showing the configuration of a GQSM System Model with illustration for $N_t=6$ and $N_u=2$ achieving a spectral efficiency of 9 bits/s/Hz. Thus, in this example, M=9 bits/s/Hz. As discussed above, modulating the RF carrier in GQSSK system by a complex data symbol leads to GQSM. A design for a GQSM transmitter is illustrated in FIG. 15 for $N_t=6$, $N_u=2$ and M=8-QAM. Since in GQSM, two subsets of transmit antennas are modulated at each time instant in order to transmit the real and the imaginary parts of a complex symbol, the spectral efficiency for GQSM is:

$$m = \left\lfloor 2\log_2\left(\frac{N_t}{N_u}\right)\right\rfloor + \log_2(M).$$

The need for RF couplers in GQSM is for the same reason as discussed previously for GQSSK. However, the GQSM transmitter is shown to be a bit complex, as compared to previously-described systems. Hitherto, configurations having a single RF chain are shown to be sufficient to implement a GQSM transmitter.

In conclusion, the SSK systems family is very simple, and their transmitters can be designed solely through RF switches. Their data rate is limited and depends on the size of the spatial constellation diagram. Alternatively, the SM family of techniques, such as SM and QSM, require more complex transmitters as compared to the SSK family by adding an additional signal constellation diagram and modulating the RF carrier to achieve a higher data rate. Nonetheless, all these schemes can operate with a maximum of one RF chain. SMTs can achieve better BER performance as compared to SMX, while achieving lower complexity and consuming less power. The receiver complexity for SMTs is much less than that of SMX MIMO systems.

It can be seen that for all GSMTs, the transmitter can be designed with only a single RF chain or without any RF chain at all. Only physical antennas need to be deployed at sufficient spatial separations among them to avoid any correlation. Standard off-the-shelf components can be used in the implementation in order to provide the different transmitters with such hardware as RF switches, combiners, splitters and others, and the components can be optimized to meet the specific nature of GSMTs.

It will be understood that many additional changes in the details, materials, steps and arrangement of parts, which have been herein described and illustrated to explain the nature of the subject matter, may be made by those skilled in the art within the principle and scope of the appended claims.

It is to be understood that the present invention is not limited to the embodiments described above, but encompasses any and all embodiments within the scope of the following claims.

We claim:

1. A wireless multiple-input multiple-output (MIMO) communications system, implementing a single radio frequency (RF) chain using multiple transmit antennas, comprising:
a first circuit for receiving data bits and forming a plurality of symbols therefrom by mapping the data bits to a quadrature or complex symbol signal stream based on a predetermined symbol constellation;
a decoder circuit for receiving the quadrature or complex symbol stream and providing a single RF signal output modulated by the quadrature or complex symbol stream;
an RF switching circuit for directing the single RF signal output sequentially to antenna subsets, each of the subsets having a plurality of transmit antennas; and
a second circuit configured for providing an index of the antenna subsets, wherein the RF switching circuit is configured for activating the one or more of the plurality of transmit antennas at any given time during transmission of the single RF chain, according to the index of antenna subsets, further wherein switching by the RF switching circuit according to the index of antenna subsets provides spatial modulation (SM) of the RF signal output as transmitted through the antennas, rendered as a single RF chain through the plurality of antennas as transmitted through the antenna subsets, further wherein the spatial modulation (SM) of the RF signal provides space shift keying (SSK) implemented with spatial modulation, as spatial modulation techniques (SMTs), the SMTs comprising modulation selected from GSSK (Generalized Space Shift Keying), wherein the RF switching circuit includes two RF switches, the first switch having two outputs and selects a first antenna of the plurality of transmit antennas based on the most significant bit of the data bits, the other switch having four outputs and selects a second antenna of the plurality of transmit antennas based on the other bits of the data bits, thereby ensuring that two transmit antennas are activated at one time.

2. The wireless MIMO communications system of claim 1, wherein each said antenna subset comprises a distinct antenna array within the plurality of antennas, and the plurality of antennas comprise plural distinct antenna arrays.

3. The wireless MIMO communications system of claim 1, wherein each said antenna subset comprises a single antenna array within the plurality of antennas.

4. The wireless MIMO communications system of claim 1, wherein at least one said antenna subset comprises a single antenna array within the plurality of antennas and the plurality of antennas comprise plural distinct antenna arrays.

5. The wireless MIMO communications system of claim 1, wherein at least one said antenna subset consists of a single antenna within the plurality of antennas.

6. A method for providing wireless communication implementing wireless multiple-input multiple-output (MIMO) communications in a single radio frequency (RF) chain using multiple transmit antennas, the method comprising:
receiving data bits and forming a plurality of symbols therefrom by mapping the data bits to a quadrature or complex symbol signal stream based on a predetermined symbol constellation;
receiving the quadrature or complex symbol stream and decoding the quadrature or complex symbol stream;
providing a single RF signal output modulated by the quadrature or complex symbol stream;
using an RF switching circuit to direct the single RF signal output sequentially to antenna subsets comprising a plurality of transmit antennas; and
generating data to provide an index of the antenna subsets, wherein the RF switching circuit is configured for activating the plurality of transmit antennas at any given time during transmission of the single RF chain, according to the index of antenna subsets, further whereby switching by the RF switching circuit according to the index of antenna subsets provides spatial modulation (SM) of the RF signal output as transmitted through the antennas, rendered as a single RF chain through the plurality of transmit antennas as transmitted through the antenna subsets, further wherein the spatial modulation (SM) of the RF signal provides space shift keying (SSK) implemented with spatial modulation, as spatial modulation techniques (SMTs), the SMTs comprising modulation selected from the GSSK (Generalized Space Shift Keying), wherein the RF switching circuit includes two RF switches, the first switch having two outputs and selects a first antenna of the plurality of transmit antennas based on the most significant bit of the data bits, the other switch having four outputs and selects a second antenna of the plurality of transmit antennas based on the other bits of the data bits, thereby ensuring that two transmit antennas are activated at one time.

* * * * *